(12) United States Patent
Korn

(10) Patent No.: US 7,958,133 B2
(45) Date of Patent: Jun. 7, 2011

(54) APPLICATION CONVERSION OF SOURCE DATA

(75) Inventor: David Korn, New York, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 231 days.

(21) Appl. No.: 11/311,423

(22) Filed: Dec. 20, 2005

(65) Prior Publication Data

US 2006/0248521 A1 Nov. 2, 2006

Related U.S. Application Data

(60) Provisional application No. 60/675,183, filed on Apr. 27, 2005.

(51) Int. Cl.
*G06F 17/30* (2006.01)

(52) U.S. Cl. .......... 707/755; 707/803; 707/999.006; 707/999.101

(58) Field of Classification Search .......... 707/1, 3, 707/6, 10, 100, 101, 200, 201, 203, 205, 707/104.1, 755, 803, 999.001, 999.006, 999.101, 707/999.2; 717/100, 137, 162
See application file for complete search history.

(56) References Cited

U.S. PATENT DOCUMENTS

| | | | |
|---|---|---|---|
| 5,416,917 A | 5/1995 | Adair et al. | |
| 5,524,253 A | 6/1996 | Pham et al. | |
| 5,923,879 A | 7/1999 | Sasmazel et al. | |
| 5,970,490 A | 10/1999 | Morgenstern et al. | |
| 6,154,748 A * | 11/2000 | Gupta et al. | 707/102 |
| 6,381,616 B1 | 4/2002 | Larson et al. | |
| 6,400,287 B1 | 6/2002 | Ehrman | |
| 6,438,745 B1 * | 8/2002 | Kanamaru et al. | 717/137 |
| 6,523,172 B1 | 2/2003 | Martinez-Guerra et al. | |
| 6,615,327 B1 | 9/2003 | Satoyama et al. | |
| 6,691,113 B1 | 2/2004 | Harrison et al. | |
| 6,795,868 B1 * | 9/2004 | Dingman et al. | 707/999.202 |
| 6,868,424 B2 | 3/2005 | Jones et al. | |
| 6,907,433 B2 * | 6/2005 | Wang et al. | 707/104.1 |
| 6,928,643 B2 * | 8/2005 | McGoogan et al. | 717/162 |
| 6,940,431 B2 | 9/2005 | Hayami | |
| 7,003,529 B2 | 2/2006 | Lusen et al. | |
| 2006/0230319 A1 * | 10/2006 | Ryali et al. | 714/38 |
| 2007/0179939 A1 * | 8/2007 | O'Neil et al. | 707/4 |
| 2008/0155500 A1 | 6/2008 | Richmond | |

OTHER PUBLICATIONS

EP Search Report for EP 06113167 dated Jun. 27, 2006.
Lowry, P.B., "XML Data Mediation and Collaboration: A Proposed Comprehensive Architecture and Query Requirements for Using XML to Mediate Heterogeneous Data Sources and Targets", Proceedings of the 34th Hawaii International Conference on Systems Science, Jan. 3, 2001.

* cited by examiner

*Primary Examiner* — Marc R Filipczyk

(57) ABSTRACT

A method leverages the file format information used by a target application to convert a source dataset into an encoding usable by the target application without converting the source dataset before migration and without modifying the target application. The source data when on the source system has random portions of various data types that are encoded in a source encoding based on data type. The target application, which typically processes data encoded in a target encoding that is based on data type, is able to process the source data despite the source encoding using file format information and a modified compiler library.

19 Claims, 5 Drawing Sheets

APPLICATION CONVERSION OF SOURCE DATA

BACKGROUND OF THE INVENTION

This application is related to U.S. Provisional Patent Application 60/675,183, entitled "Automation of Data Conversion from Mainframes," filed on Apr. 27, 2005, which is incorporated herein by reference in its entirety.

Field of Invention

The invention relates generally to data conversion and, more particularly, to a method for migrating data from a source system to a target system without converting the data before migration and without modifying the target application.

Background

One problem encountered when migrating an application from a source platform to a target platform is the compatibility of the source data with the target platform. The application on the source platform and the application on the target platform may both read datasets that use common byte lengths to represent a character or number, but may use different values for bits within each byte to represent the characters and numbers. In other words, the data on the source platform may use numbers and characters that are encoded in an encoding that cannot be easily manipulated by the target platform applications.

When all of the bytes in a source dataset represent either all printable characters or all numbers, then conversion to/from a source encoding from/to a target encoding is simple since each byte in the source dataset can be replaced by the corresponding byte from the target encoding. Even if the source dataset contains records that include both printable characters as well as numeric data, conversion can be easily performed if the source dataset is composed of a fixed file format that contains fixed record locations and fixed field formats for the numeric and character portions of the data within a record.

However, source datasets often contain records with variable lengths and different mixtures of data types such as numeric data and character data that are not in fixed positions. Despite the random nature of the data, the source dataset can be parsed using the application that created the dataset using file format information which specifies the locations of records and contains field layout information that describe the lengths and locations of data types within each record. Conversion of these datasets can be complex and can require a great deal of effort in describing the data and writing or generating conversion programs for each unique dataset file format. Thus there is a need for a method that can leverage the file format information used by a target application to convert a source dataset into an encoding usable by the target application without converting the source dataset before migration and without modifying the target application.

SUMMARY OF THE INVENTION

A method leverages the file format information used by a target application to convert a source dataset into an encoding usable by the target application without converting the source dataset before migration and without modifying the target application. The source data when on the source system has random portions of various data types that are encoded in a source encoding based on data type. The target application, which typically processes data encoded in a target encoding that is based on data type, is able to process the source data despite the source encoding using file format information and a modified compiler library. When a portion of the source data is retrieved for manipulation by the target application using file format information, the modified compiler library called by the target application converts the retrieved portion of the source data into an encoding that can be manipulated by the target application.

DETAILED DESCRIPTION

Figure 1:
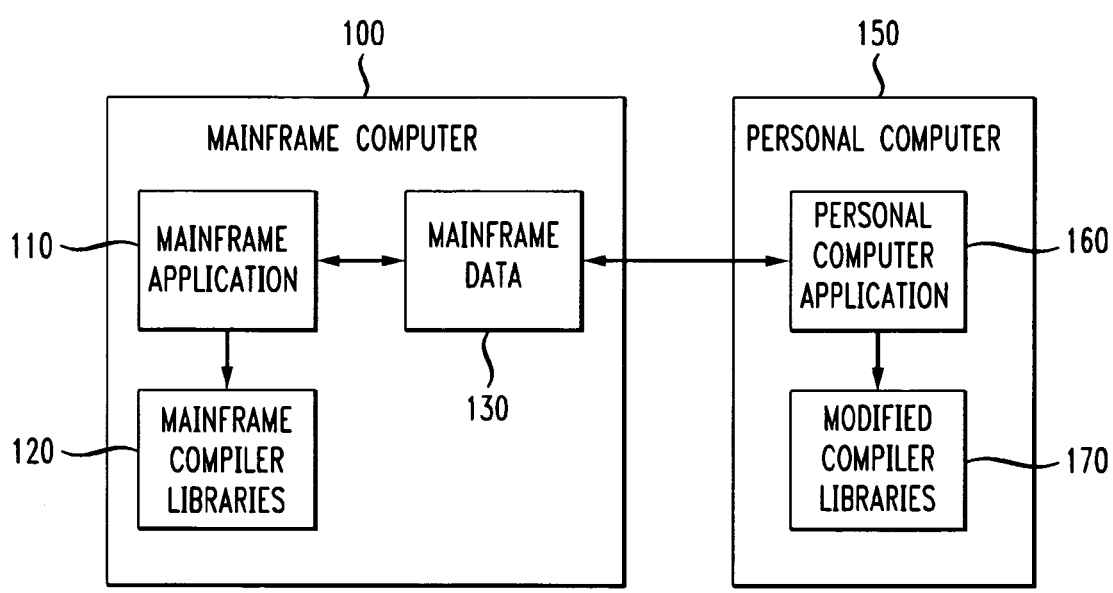
FIG. 1 is a schematic diagram of an embodiment of the invention.

The diagram in FIG. 1 illustrates a personal computer application 160 receiving, processing, and manipulating mainframe data 130 from a mainframe computer 100. Manipulating includes functions such as reading data, performing mathematical operations, writing data, and executing programs. The mainframe data 130 contains character data portions and numeric data portions that are encoded, based on data type, in a mainframe encoding for use by the mainframe application 110. The personal computer application 160 is a version of the mainframe application 110 configured for use on a personal computer 150. Although the applications 110 and 160 are the same application, since the mainframe data 130 is encoded in a mainframe encoding, the mainframe data 130 cannot be directly manipulated by the personal computer application 160 using compiler libraries that are configured to manipulate data that is encoded for the personal computer application 160.

The file format information, however, used by the personal computer application 160 is the same as the file format information used by the mainframe application 110 to process the mainframe data 130. Even if the mainframe data 130 contains records with variable lengths and different mixtures of data types such as numeric data and character data that are not in fixed positions, the file format information specifies the locations of records and contains field layout information that describe the lengths and locations of data types within each record. Simply put, the file format information specifies the portions of the mainframe data 130 that are character data and the portions of the mainframe data 130 that are numeric data. The personal computer application 160 can use the common file format information to parse the character and numeric portions of the mainframe data 130. Before manipulating the mainframe data 130, the personal computer application 160 parses the mainframe data 130 using the file format information and converts the parsed data using a modified compiler library 170 that is modified to convert the mainframe data 130 into an encoding that can be manipulated by the personal computer application 160. The personal computer application 160 itself is not modified, but the compiler libraries called by the personal computer application 160 are modified. The compiler and application could be coded in any programming language, such as COBOL and C++, used for manipulating a variety of datasets in encodings such as EBCDIC, ASCII, binary, and packed decimal.

Assume, for example, that the portion of the mainframe data 130 that is a character data type is encoded in an EBCDIC encoding and that the personal computer application 160 manipulates character data that is encoded in an ASCII encoding. Also, assume that the personal computer application 160 can manipulate binary data and that the numeric data in the mainframe data 130 is encoded in a binary encoding. When the personal computer application 160 uses the numeric data, which is encoded in a binary encoding, the personal computer application 160 can manipulate the data normally. However, when using the portions of the mainframe data 130 that are character data, the compiler library used by the personal computer application 160 for manipulating character data can be modified so that the character data, when retrieved using file format information, can be converted from the EBCDIC characters into ASCII characters. The personal computer application 160 is not modified, only the selected compiler library used by the personal computer application 160 for manipulating character data is modified to convert the mainframe data 130 into an encoding usable by the personal computer application 160.

In alternative embodiments, data can be converted from any type of source system using source data encoded in a source encoding to any type of target system using a target application to convert the source data into a target encoding that calls modified target libraries. For example, the source system and target system can both be mainframe computers that are configured to read data encoded in different encodings.

Also, rather than modifying the compiler libraries used by the target system, the compiler libraries on the source system can be modified so that the source application produces data that can be read by an application migrated to the target system. In some embodiments, both the libraries on the source and target system can be modified.

In separate embodiments, the location of the source data can be on the source system or can be transmitted to the target system for use. Also, the data types used by the source and target systems are not necessarily confined to character and numeric data types. For example, the source data accessed by a target system can contain other data types such as symbolic data as well as character and numeric data.

Using the approach of modifying compiler libraries to convert data rather than modifying system applications, a multiplicity of migrated system applications using unique file format information can convert/process and then manipulate source data from a source system. The structure or variability that can occur in file format information will not be a factor in data conversion. For example, assume that several applications written in COBOL are migrated from a mainframe computer using mainframe data to a personal computer that will manipulate the mainframe data. Also assume that the mainframe computer manipulates data in an EBCDIC encoding and that the personal computer normally manipulates data encoded in an ASCII encoding. If the COBOL compiler libraries on the personal computer are modified for use by one of the applications, the other COBOL applications that have been migrated to the personal computer can call and use the same modified COBOL compiler libraries. Therefore, each of the several applications will be able to manipulate mainframe data by leveraging their own unique file format information to parse mainframe data and by using the common set of modified COBOL compiler libraries. Each of the applications migrated to the personal computer will not have to be specifically modified to manipulate the EBCDIC encoded mainframe data.

Figure 2:
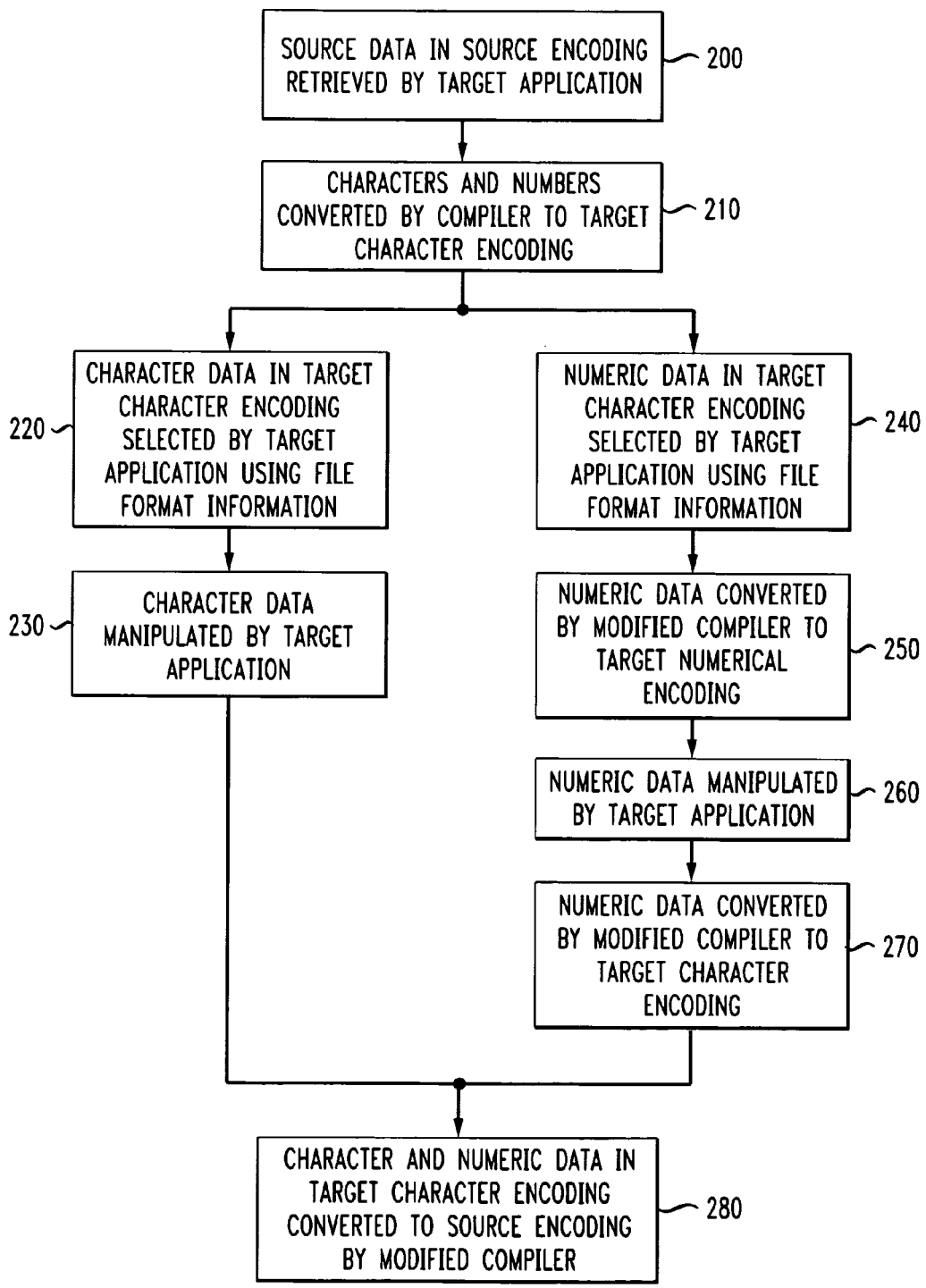
FIG. 2 is a flowchart illustrating an embodiment of the invention.

FIG. 2 is a flowchart that illustrates an embodiment of the process of converting/processing source data encoded in a source encoding for use by a target application that manipulates data in a target encoding. The target application calls modified libraries within a modified compiler to convert data so that the target application can manipulate the source data. The flowchart illustrates that the source data in a source encoding is retrieved by a target application 200. The source data retrieved can be a sub-set of source data from a source dataset or an entire source dataset. The source data can contain any combination of character and/or numeric data in a format that can be interpreted by a target application using file format information. The character data in the source data is encoded in a source character encoding and the numeric data in the source data is encoded in a source numeric encoding.

After the source data has been retrieved, the characters and numbers are converted by a modified compiler into a target character encoding 210. The conversion can be performed by a library within the compiler that has been modified to perform the conversion. For example, the library used by the target application to access data can be modified to perform the conversion when accessing the source data. The character data from the source data that was in the source character encoding is converted into the target character encoding that can be directly manipulated by the target application. The numeric data, however, is converted into a target character encoding that cannot be manipulated by the target application. The numeric data in a target character encoding is an intermediate encoding that cannot be manipulated directly by a source application or directly by the target application without further processing.

When character data is selected from the source data for manipulation by the target application using file format information 220, the character data in the target character encoding is manipulated by the target application 230. The manipulation can include operations such as reading and writing character data. In this embodiment, further conversion of the character data into a different encoding is not required for the target application to manipulate data because the character data is encoded in the target character encoding.

When numeric data is selected from the source data for manipulation by the target application 240 using file format information, the numeric data is converted by the modified compiler to the target numeric encoding 250. For example, the read compiler library used by the target application to read binary data can be modified so that the numeric data, when read, is converted from the source numeric data in the target character encoding into the target numeric encoding. In separate embodiments, any compiler library or combination of compiler libraries from the compiler can be modified to convert the source numeric data in the target character encoding into the target numeric encoding. The compiler libraries that are modified to perform the conversion of the encoded data can be optimized such that the overhead for conversion is minimized and processing time is virtually transparent to a user.

After the data is in an encoding that can be manipulated by the target application, the numeric data is manipulated by the target application 260. The manipulation can include operations such as simply reading the data or the execution of a combination of mathematical operations.

The numeric data is converted from the target numeric encoding into the target character encoding 270 after the data has been manipulated by the target application. The conversion can be performed by any library from the compiler that has been modified to perform the conversion. For example, the write compiler library used by the target application to write binary data can be modified so that the numeric data, when written, is converted from the target numeric encoding into the target character encoding.

The source data in the target character encoding is then converted to the source encoding by the modified compiler 280. This final conversion returns the source data to its original encoding in the source encoding. The conversion can be performed by a library within the compiler that has been modified to perform the conversion. For example, a library used by the target application to write data can be modified to perform the conversion when writing the source data.

In separate embodiments, the conversion of characters and numbers into different encodings does not necessarily have to be performed by modified compiler libraries that make up a modified compiler, the conversion can be performed by any combination of software, functions, and/or hardware that is somehow invoked by the target application.

In alternative embodiments, the source data can be converted from a source encoding that encodes characters and numbers in separate encodings into an intermediate encoding that is a target numeric encoding rather than a target character encoding. In this scenario, the numeric data can be manipulated without additional conversion, but the character data in the target numeric encoding would have to be converted into a target character encoding before the character data can be manipulated.

In yet other embodiments, the intermediate encoding can be an encoding that is unrelated to a target character encoding or target numeric encoding. Both the character data and the numeric data would have to be converted from the intermediate encoding into an encoding that can be manipulated by the target application.

Figure 3:
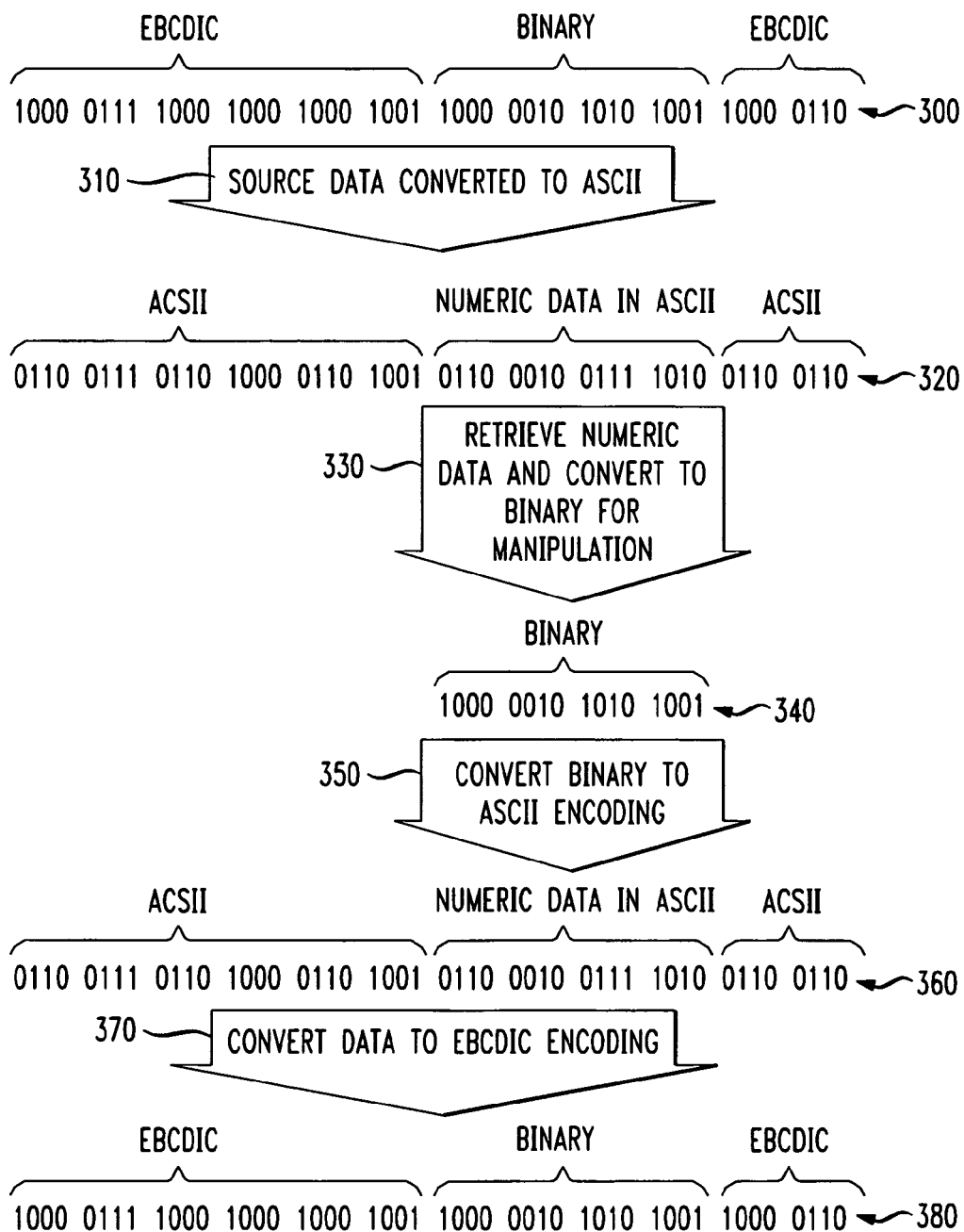
FIG. 3 is a figure illustrating the processing of source data on a target system according to the flowchart in FIG. 2.

FIG. 3 illustrates an embodiment implementing the flow illustrated in FIG. 2. The source data encoded in an EBCDIC encoding is being converted for use by a target application that normally manipulates data in an ASCII encoding. The source data 300 contains both character portions that are encoded in EBCDIC encoding and numeric data that is encoded in a binary encoding. The source data 300 can be a sub-set of source data from a source dataset or an entire source dataset. Each 8-bit byte from the source data, including the binary data in the binary encoding, is converted to ASCII 310. The result is source data in an ASCII encoding 320 where both the character and numeric portions of the source data have been read as EBCDIC characters and converted to an ASCII encoding. The numeric portion of the data is in a mangled intermediate encoding.

When numeric data is retrieved for manipulation using file format information, the numeric data in ASCII encoding is converted to a binary encoding for manipulation 330. This involves the use of a compiler library that can translate binary data which was read as EBCDIC character data and converted to an ASCII encoding back into binary data. After the translation is completed, the portion of numeric source data in a binary encoding 340 can now be manipulated. In this embodiment, the numeric data is only read and is not modified. After the manipulation of the data is completed, the source data in the binary encoding 340 is converted to the ASCII character encoding 350.

The source data in the ASCII encoding 360 is converted to the original EBCDIC encoding 370 by converting each 8-bit byte from the ASCII character encoding, including the intermediate encoding of the binary portion of the data, to the EBCDIC character encoding. The result is the source data encoded in the EBCDIC encoding 380 that includes both a binary encoding for numeric portions of data and the EBCDIC character encoding for the character portions of data.

Although the embodiment described above involves the conversion of 8-bit bytes, the method can be applied to binary streams where characters and numbers are represented by any bit length or even variable bit lengths.

Figure 4:
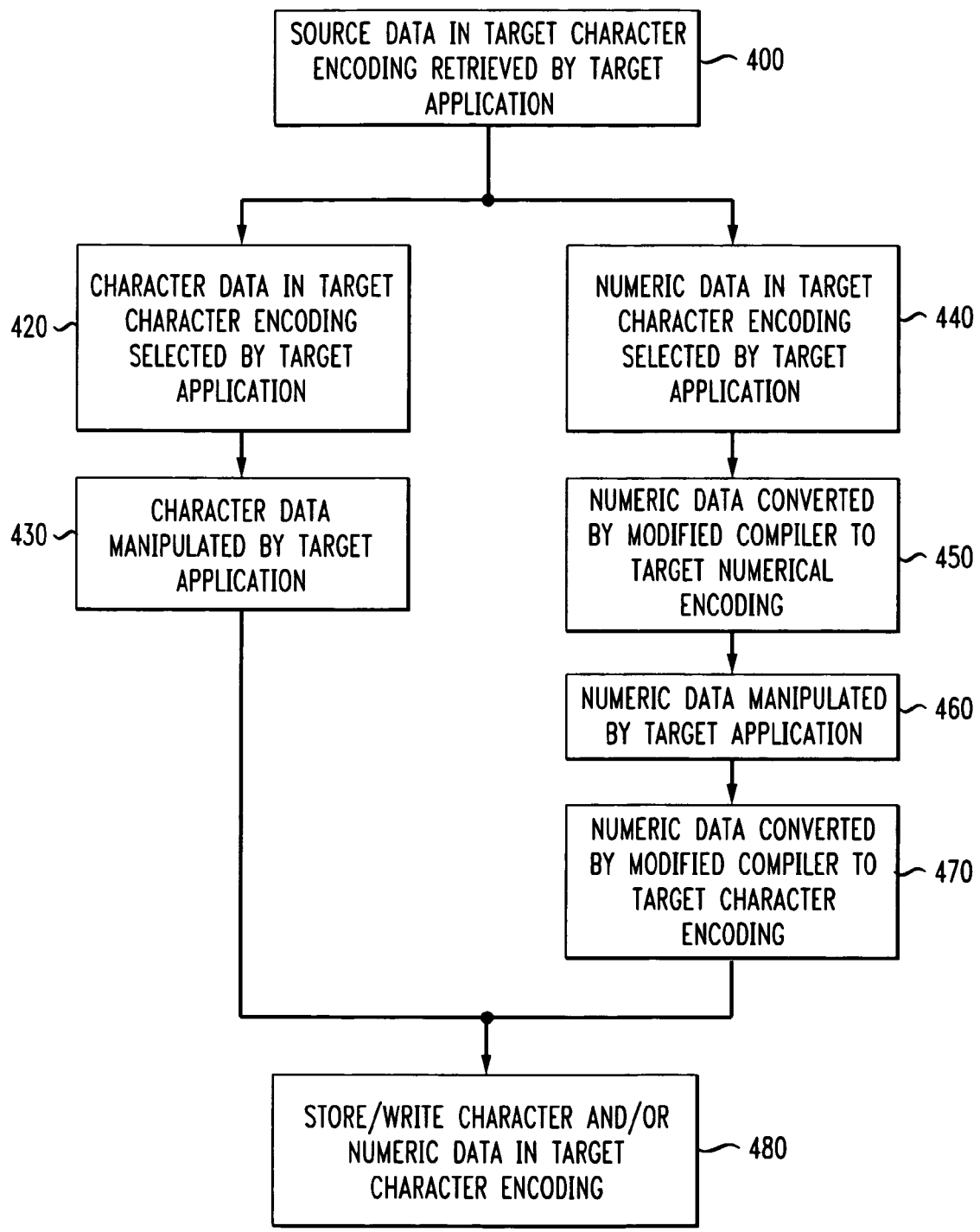
FIG. 4 is a flowchart illustrating an embodiment of the invention.

FIG. 4 is a flowchart that illustrates an embodiment of the process of converting source data encoded in a source encoding for use by a target application that manipulates data in a target encoding. The target application calls modified libraries within a modified compiler to convert data so that the target application can manipulate the source data. In this embodiment, the source data is already converted to the target character encoding (intermediate encoding) before being retrieved by the target application 400. The flowchart illustrates that the source data encoded in the target character encoding is retrieved by a target application 400.

When character data, using file format information, is selected from the source data for manipulation by the target application 420, the character data in the target character encoding is manipulated by the target application 430. The flowchart illustrates that after manipulating the source character data encoded in the target character encoding, the source character data is stored/written in the target character encoding 480.

When numeric data is selected from the source data for manipulation by the target application 440 using file format information, the numeric data is converted by the modified compiler to the target numeric encoding 450. After the data is in an encoding that can be manipulated by the target application, the numeric data is manipulated by the target application 460. The numeric data is converted from the target numeric encoding into the target character encoding 470 after the data has been manipulated by the target application. The flowchart illustrates the source numeric data is stored/written in the target character encoding 480.

Figure 5:
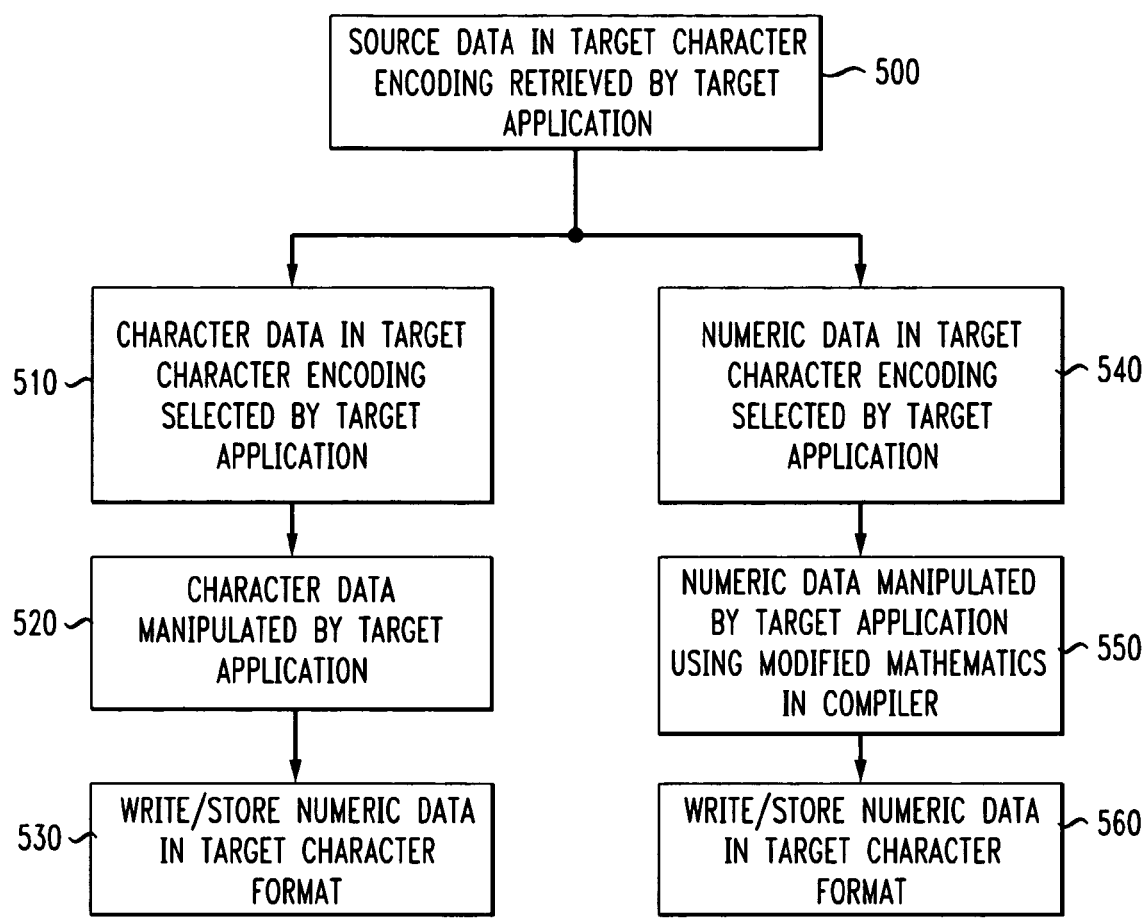
FIG. 5 is a flowchart illustrating an embodiment of the invention.

FIG. 5 is a flowchart that illustrates an embodiment that allows for the manipulation of source data by a target application using a compiler that contains libraries that have been modified. In this embodiment, the source data is already converted to the target character encoding (intermediate encoding) before being retrieved by the target application 500. Character data is retrieved by the target application 520 using file format information, manipulated by the target application 520, and is stored/written by the target application in the target character encoding 530.

However, when numeric data is selected for manipulation by the target application using file format information 540, the numeric data is manipulated using mathematical libraries that have been modified such that the target application can manipulate the numeric data in the target character encoding 550. For example, if the bytes in a numeric portion of source data was originally encoded in a binary encoding and was converted to an intermediate ASCII character encoding, a compiler library can be modified to execute a mathematical operation such as a subtract operation using bytes in the intermediate ASCII character encoding.

After the data has been manipulated, the numeric data is stored/written in the target character encoding 560.

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents. While the invention has been particularly shown and described with reference to specific embodiments thereof, it will be understood that various changes in form and details may be made.

What is claimed is:

1. A method, comprising:
    modifying an existing compiler library into a modified compiler library, wherein the existing compiler library is used by a source application;
    receiving source data;
    parsing the source data to specify a data type using file format information, wherein the file format information is used by both the source application and a target application, wherein the file format information comprises information that specifies first portions of the source data comprising character data and second portions of the source data comprising numeric data, wherein the file format information is external to the source data and to the modified compiler library, wherein the data type comprises a character data type and a numeric data type; and
    processing the source data using the modified compiler library at a target system, the source data being migrated from a source system to the target system, the source data having a plurality of portions encoded in a source encoding based on the data type, the modified compiler library is used by a processor to convert a portion of the source data into a target encoding to be manipulated by the target application.

2. The method of claim 1, wherein the file format information is called by the target application.

3. The method of claim 1, wherein the target application calls the modified compiler library.

4. The method of claim 1, wherein locations of the portions encoded in the source encoding based on the data type are not fixed.

5. The method of claim 1, wherein a length of each of the portions encoded in the source encoding based on the data type is not fixed.

6. The method of claim 1, wherein the modified compiler library is a modified target compiler library.

7. The method of claim 1, wherein the target application is configured to manipulate data encoded in the target encoding.

8. The method of claim 1, wherein the target application manipulates a portion of the source data without converting the portion of the source data into source data encoded in the target encoding based on data type.

9. The method of claim 1, further comprising manipulating the source data using the target application.

10. The method of claim 1, wherein the modified compiler library is modified such that the target application uses the modified compiler library to manipulate the source data encoded in the source encoding.

11. A method, comprising:
    receiving source data encoded in an intermediate encoding, the source data having a plurality of different data types including a character data type and a numeric data type, the intermediate encoding being an encoding converted from a source encoding based on data type into a single data type target encoding;
    retrieving a portion of the source data with the single data type encoded in the intermediate encoding using file format information, wherein the file format information is used by both a source application and a target application, wherein the file format information comprises information that specifies first portions of the source data comprising character data and second portions of the source data comprising numeric data, wherein the file format information is external to the source data, wherein the file format information is called by the target application; and
    processing the portion of the source data with the single data type encoded in the intermediate encoding by a processor using a compiler library called by the target application.

12. The method of claim 11, wherein the target application is configured to process source data encoded in a target encoding based on data type.

13. The method of claim 11, further comprising manipulating using the target application the portion of the source data with the single data type using the compiler library called by the target application.

14. The method of claim 11, wherein the target application manipulates the portion of the source data with the single data type encoded in the intermediate encoding without converting the portion of the source data with the single data type into a target encoding based on data type.

15. The method of claim 11, wherein the compiler library is a modified compiler library used to convert the source data encoded in the intermediate encoding into source data encoded in a target encoding based on data type.

16. The method of claim 11, wherein the compiler library is a modified compiler library used to convert source data encoded in a target encoding based on data type into the source data encoded in the intermediate encoding.

17. The method of claim 11, wherein the compiler library is a modified compiler library used to manipulate the source data encoded in the intermediate encoding.

18. The method of claim 11, further comprising:
    receiving source data encoded in the source encoding based on data type; and
    converting the source data encoded in the source encoding based on data type into the intermediate encoding.

19. The method of claim 11, further comprising converting the source data encoded in the intermediate encoding into source data encoded in the source encoding based on data type.

* * * * *